United States Patent Office 3,546,560
Patented Dec. 8, 1970

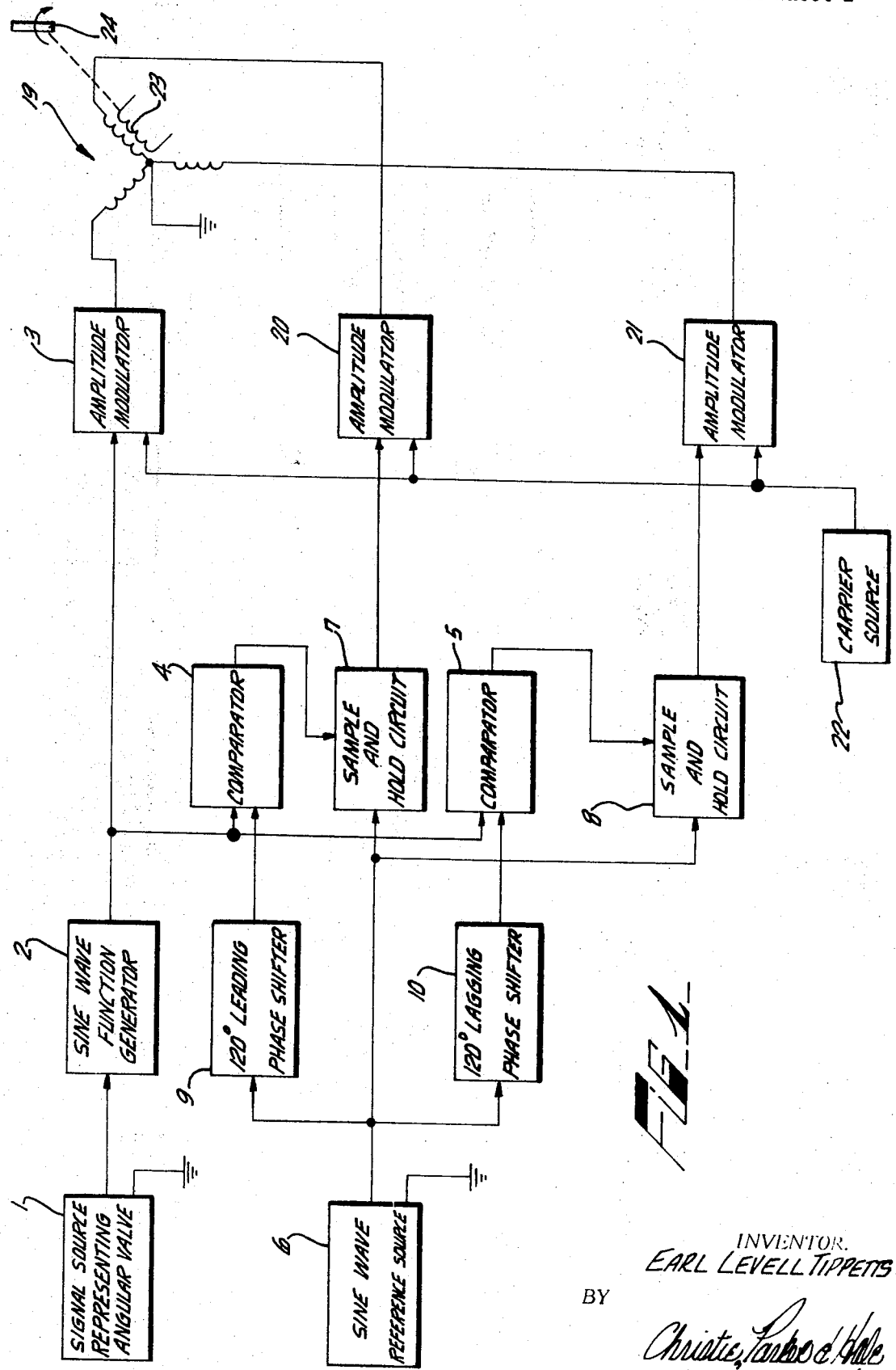

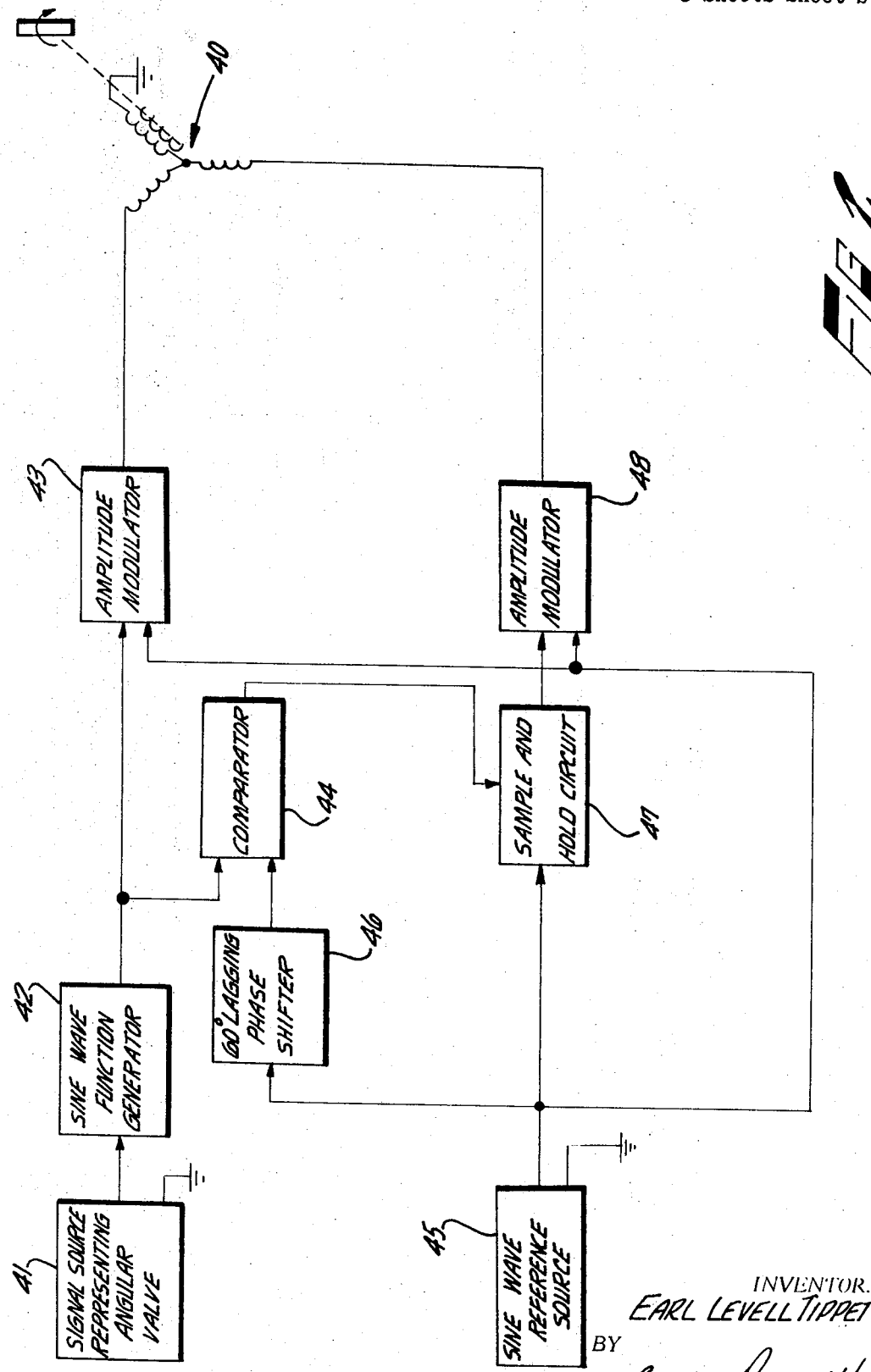

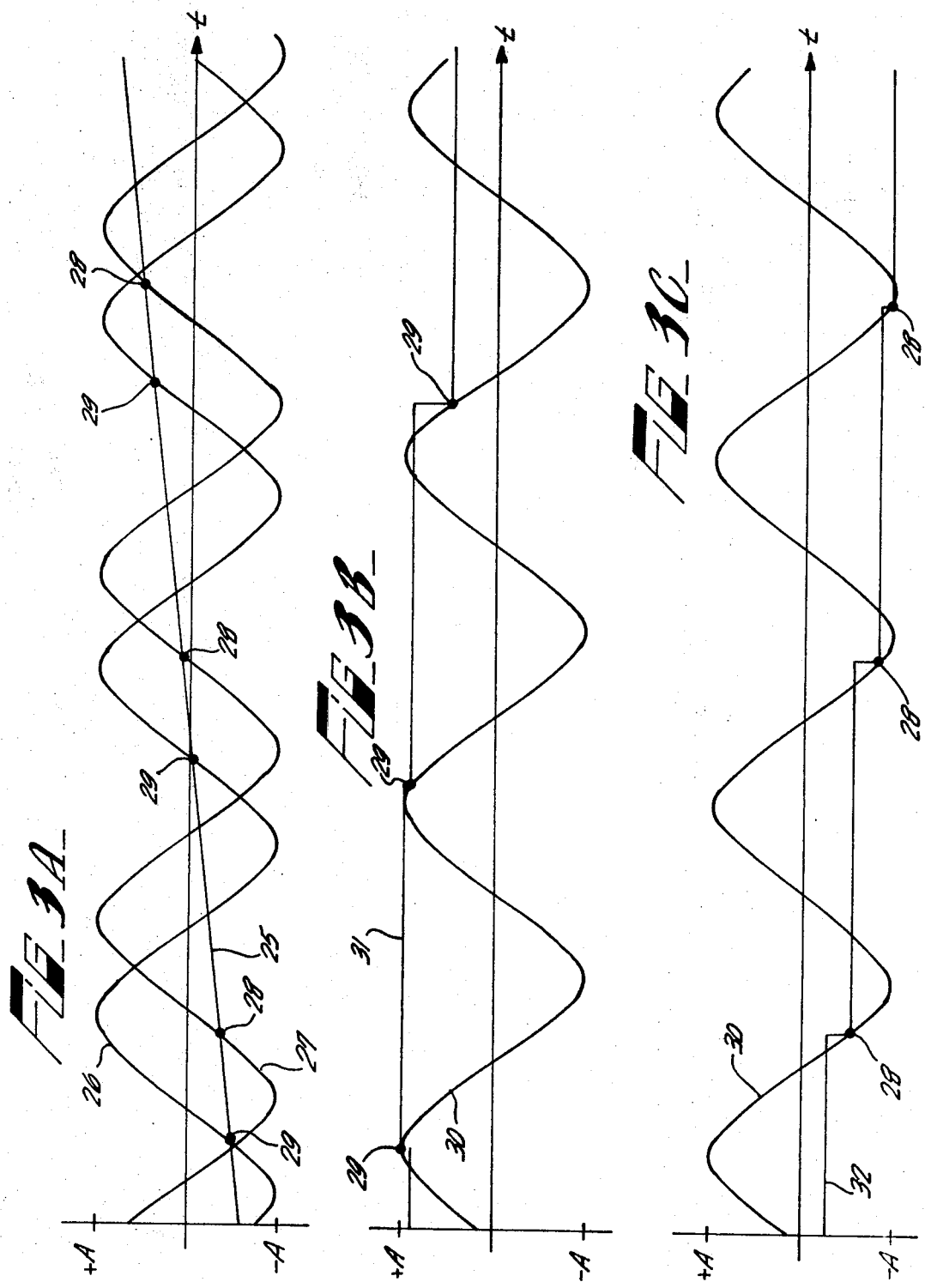

3,546,560
APPARATUS AND METHOD FOR PRODUCING PHASE SHIFTED ELECTRICAL SIGNALS AND SELF-SYNCHRONOUS MOTOR ACTUATED THEREBY
Earl Le Vell Tippetts, Reno, Nev., assignor to Lear Siegler, Inc., Santa Monica, Calif., a corporation of Delaware
Filed Nov. 18, 1968, Ser. No. 776,735
Int. Cl. G05b 11/12
U.S. Cl. 318—690          14 Claims

ABSTRACT OF THE DISCLOSURE

A signal is generated that represents a periodic function of a variable quantity other than time, e.g., an angle, shifted in phase by a predetermined amount. This is accomplished in the following way: an electrical reference signal is generated that varies as the same periodic function of time; a portion of the reference signal is shifted in phase by the predetermined amount and compared in amplitude with a signal representing the periodic function of the variable quantity without a phase shift; and when the compared signals are equal in amplitude, another portion of the reference signal is sampled. The amplitudes of the sampled portions of the reference signal represent the periodic function of the variable quantity shifted in phase by the predetermined amount. The invention can be used to simulate inputs to a synchro receiver.

BACKGROUND OF THE INVENTION

This invention relates to the generation of electrical signals and, more particularly, to apparatus and a method for generating electrical signals varying as a periodic function of a variable quantity other than time shifted in phase by a predetermined amount.

It is a simple matter to shift the phase of an electrical signal that varies as a periodic function of time. By using a distributed delay line or a lumped parameter electrical network together with a phase inverting amplifier, any phase shift between 0° and 360° can be realized with precision. A much more difficult problem presents itself when an electrical signal representing a periodic function of an independently variable quantity other than time is to be shifted in phase because it is not known in advance what value the variable quantity will assume. In contrast thereto, the value of time in a periodic function of time is, of course, known in advance, so the desired phase shift can be established by introducing a given time delay.

One field in which the need had arisen to generate electrical signals representing a periodic function of a variable quantity other than time shifted in phase by a predetermined amount is aircraft flight control. Commonly, the actuators and instruments used on aircraft are driven by multiphase, electromechanical devices such as synchros. Originally, the analog computers that porduced the command signals for driving these electromechanical devices also comprised electromechanical components. Thus, if the input to the actuator or instrument were a synchro receiver, the output of the analog computer would be a synchro transmitter with the same number of control windings. In recent years, the trend has been to utilize completely electronic analog computers in aircraft flight control systems to improve their reliability, speed, and accuracy. As a result, it becomes necessary to generate from the electrical output signal produced by the electronic analog computer, a signal that is compatible with the multiphase input of the existing electromechanical driving devices. For example, a synchro receiver is excited by three signals representative of the sine of three angles shifted in phase 120° with respect to each other.

A. D. Lawson Pat. 3,376,570 discloses signal generating apparatus that produces an electrical signal representing the sine and the cosine of a variable quantity other than time, namely, an angle. However, this arrangement has shortcomings. First, it is only capable of generating one particular type of periodic function, namely a sine function, and of producing one particular phase shift, namely 90°. For a conventional three-phase synchro receiver, which requires three signals 120° out of phase with each other, the Lawson apparatus is of no use. Second, the principle on which the Lawson arrangement is based requires an elaborate arrangement of logical decision circuits that make the apparatus quite complex.

SUMMARY OF THE INVENTION

The invention utilizes a source of electrical reference signals representing the same periodic function of time as the function of the variable quantity to be shifted in phase by a predetermined amount. A portion of the reference signal is shifted in phase by the predetermined amount in the opposite direction from the desired phase shift and compared in amplitude with a signal representing the function of the variable quantity without the phase shift. When the ratio of the compared signals assumes a predetermined relationship, another portion of the reference signal is sampled momentarily. The amplitude of the sampled signal represents the periodic function of the variable quantity shifted in phase by the predetermined amount. On each cycle of the reference signal a new sample is obtained to produce a continuous representation of the periodic function of the variable quantity shifted in phase by the predetermined amount.

The described technique can be employed to produce from a single original electrical signal representing a periodic function of a variable quantity, such as an angular position, three electrical signals that are compatible with the inputs of a three-phase synchro receiver. The original electrical signal is applied per se to one input of the synchro, is shifted in phase 120° by the described technique for application to another input of the synchro, and is shifted in phase 240° for application to the third input of the synchro.

The discovery has been made that it is, in fact, not necessary to generate two phase shifted signals in addition to the original signal to achieve compatibility with a three-phase synchro receiver. It is only necessary to generate one signal that is shifted in phase by 60°. The generated signal is applied to one terminal of the synchro; the original signal is itself applied to another terminal of the synchro; and the third terminal of the synchro is connected to the common ground of the electrical system.

BRIEF DESCRIPTION OF THE DRAWINGS

The features of a specific embodiment of the best mode contemplated of carrying out the invention are illustrated in the drawings, of which:

FIG. 1 is a schematic diagram in block form of signal generating apparatus according to the invention, which is adapted to drive a three-phase synchro receiver;

FIG. 2 is a schematic diagram in block form of an alternative embodiment of the apparatus of FIG. 1, which realizes a reduction in circuit components; and FIGS. 3A, 3B, and 3C are diagrams of waveforms that explain the principles of the invention.

DESCRIPTION OF SPECIFIC EMBODIMENTS

In FIG. 1 a signal source 1, which could be the output of an electronic analog computer, produces an electrical signal whose amplitude represents an angular value position at which an actuator or instrument in an aircraft is to be set. Instead of an angular value, the output signal from source 1 could represent any other variable quantity such as linear displacement, pressure, or temperature. The output of source 1 is connected to the input of a sine wave function generator 2 that produces an electrical signal whose amplitude represents the sine of the angle represented at its input. Instead of a sine wave function, generator 2 could produce any other periodic function of the angle represented at its input, such as a ramp function. The output of function generator 2 is coupled to one input of a modulator 3, one input of a comparator 4, and one input of a comparator 5.

A reference source 6 produces an electrical signal whose amplitude varies sinusoidally as a function of time. If generator 2 produced some other periodic function of the angle than the sine, reference source 6 would produce that function of time. The output of reference source 6 is coupled directly to the signal inputs of sample and hold circuits 7 and 8. In addition, the output of reference source 6 is coupled through a 120°-leading phase shifter 9 to the other input of comparator 4 and through a 120°-lagging phase shifter 10 to the other input of comparator 5. The output of comparator 4 is connected to the control input of sample and hold circuit 7, while the output of comparator 5 is connected to the control input of sample and hold circuit 8. Comparator 4 produces an actuating pulse for sample and hold circuit 7 each time that the ratio of the amplitude of the output signal produced by generator 2 to the amplitude of the sine wave produced by reference source 6 exceeds a predetermined value fixed by the ratio of their maximum amplitudes. For the purpose of illustration, it is assumed that the maximum amplitude of the output of generator 2 equals the maximum value amplitude of the output of reference source 6, so the predetermined value of the compared ratio is unity. Following this assumption, comparator 4 produces an actuating pulse each time the sine wave reference signal from source 6 with a 120° leading phase shift exceeds the amplitude of the output signal from generator 2. Sample and hold circuit 7 produces at its output an electrical signal whose amplitude is proportional to the amplitude of the reference signal applied to its input at the instant of application of the actuating pulses from comparator 4. In other words, sample and hold circuit 7 samples the signal applied to its signal input each time an actuating pulse is applied to its control input and holds the sampled value until the next actuating pulse occurs, at which time it samples again. The constant of proportionality of sample and hold circuit 7 is the inverse of the compared ratio. Following the assumption of a compared ratio of unity, the constant of proportionality of sample and hold circuit 7 is also unity, i.e., the amplitude of the signal at its output equals the amplitude of the signal at its input at the instant of application of the actuating pulse. If the signal at the output of function generator 2 is $A \sin \theta$, where $A$ is the maximum amplitude of the signal and $\theta$ is the angular value represented at the output of source 1, and the signal produced at the output of reference source 6 is $A \sin \omega t$, where $\omega$ is the frequency of the reference signal in radians per second and $t$ is time, then at the instant of application of each actuating pulse to sample and hold circuit 7

$$A \sin (\omega t + 120°) = A \sin \theta$$

because these are the two input signals to comparator 4. By trigonometric manipulations, this equation can be expressed as $$A \sin \omega t = A \sin (\theta - 120°)$$

which is the input signal to sample and hold circuit 7. In other words, the amplitude of the signal at the output of sample and hold circuit 7 represents the sine of the angular value from source 1 shifted in phase by 120° in a lagging direction. In similar fashion, the amplitude of the signal produced at the output of sample and hold circuit 8 represents the sine of the angular value from source 1 shifted in phase by 120° in a leading direction.

The output of sample and hold circuit 7 is coupled to one input of an amplitude modulator 20, and the output of sample and hold circuit 8 is coupled to one input of an amplitude modulator 21. The output of a carrier source 22 is coupled to the other inputs of modulators 3, 20 and 21, which produce at their respective outputs the carrier signal modulated by the sine of the angular value at the output of source 1 in three-phase relationship, i.e., 120° out of phase with each other. The outputs of modulators 3, 20, and 21 are connected to the inputs of a three-phase synchro receiver 19 having a rotor 23 that is mechanically coupled to a rotatable component 24 of the aircraft. The junction of the windings of synchro receiver 19 is connected to the common ground of the system with respect to which the outputs of sources 1 and 6 and the remaining components of FIG. 1 are referenced. Component 24 is driven by rotor 23 so its angular position corresponds to the value of source 1. Thus, compatible inputs for synchro receiver 19 are generated from a single source of electrical signals.

The operation of the apparatus of FIG. 1 is depicted graphically by the time-varying waveforms in FIGS. 3A, 3B, and 3C. In FIG. 3A waveform 25 represents the signal at the output of function generator 2, sinusoidal waveform 27 represents the signal at the output of phase shifter 9, i.e., the reference signal shifted in phase by 120° in a leading direction, and waveform 26 represents the signal at the output of phase shifter 10, i.e., the reference signal shifted in phase by 120° in a lagging direction. Points 28 represent the instants in time at which comparator 4 produces actuating pulses and points 29 represent the instants in time at which comparator 5 produces actuating pulses. In FIG. 3B waveform 30 represents the reference signal without a phase shift which is the signal applied from source 6 to the input of sample and hold circuit 8, and waveform 31 represents the signal at the output of sample and hold circuit 8. FIG. 3B illustrates particularly that waveform 31 assumes the same amplitude as waveform 30 at each point 29 and holds this assumed amplitude until the next occurrence of a point 29. In FIG. 3C waveform 30 again represents the reference signal without a phase shift, which is also the signal applied from source 6 to the input of sample and hold circuit 7, and waveform 32 represents the signal at the output of sample and hold circuit 7. FIG. 3C illustrates particularly that waveform 32 assumes the same value as the reference signal at each point 28 and retains the assumed value until the next point 28. The rate of change of waveform 25 relative to the frequency of the reference signal is exaggerated for purposes of illustration in FIGS. 3A, 3B, and 3C. In actuality the frequency of the reference signal would be much greater than the rate of change of the angular value from source 1 so the sampling frequency is sufficiently large to convey all the information represented by this angular value. Thus, waveform 31 represents waveform 25 shifted in phase by 120° in a leading direction, and waveform 32 represents waveform 25 shifted in phase by 120° in a lagging direction.

In FIG. 2, apparatus is shown that provides suitable electrical signals to drive a synchro receiver 40 with fewer components than the apparatus of FIG. 1. A signal source 41, which produces an electrical signal representing an angular value, is coupled to a sine wave function generator 42. The output of generator 42 is connected to one input of a modulator 43 and to one input of a comparator 44. A reference source 45, which produces a sine wave reference signal, is coupled through a 60° lagging phase shifter 46 to the other input of comparator 44 and is coupled directly to the signal input of a sample and hold circuit 47. The output of comparator 44 is connected to the control input of sample and hold circuit 47, which produces a signal at its output whose amplitude represents the sine of the angular value from source 41 shifted in phase by 60° in a leading direction. The output of sample and hold circuit 47 is connected to one input of a modulator 48. In this embodiment of the invention, the reference signal from source 45 is also used as the carrier for synchro receiver 40. To this end, the output of source 45 is coupled to the other inputs of modulators 43 and 48. The output of modulator 43, which is the reference signal modulated by the sine of the angular value from source 41, is connected to one input of synchro receiver 40. The output of modulator 48, which is the reference signal modulated by the sine of the angular value from source 41 shifted in phase by 60° in a leading direction, is connected to the second input of synchro receiver 40. The third input of synchro receiver 40 is grounded so it is at the same potential with respect to which sources 41 and 45 and the remaining components in FIG. 2 are referenced. The arrangement of FIG. 2 produces the same three-phase relationship among the voltages impressed across the windings of synchro receiver 40 that is produced in the arrangement of FIG. 1. Moreover, only one comparator, one phase shifter, one sample and hold circuit, and two modulators are required.

What is claimed is:

1. Apparatus for generating a signal that represents a periodic function of a variable quantity other than time shifted in phase by a predetermined amount, the apparatus comprising:
   means for generating an original signal that represents the periodic function of the variable quantity without a phase shift;
   means for generating a reference signal that represents the periodic function of time;
   means for shifting the phase of a first portion of the reference signal by the predetermined amount in the opposite direction from the desired phase shift; and
   means responsive to the occurrence of a predetermined relationship in the amplitude ratio of the phase shifted portion of the reference signal to the original signal for sampling a second portion of the reference signal to generate a signal representative of the amplitude of the second portion of the reference signal at the time of sampling, the generated signal representing the periodic function of the variable quantity shifted in phase by the predetermined amount.

2. The apparatus of claim 1, in which the maximum amplitude of the original signal equals the maximum amplitude of the reference signal and the relationship in the ratio responsive to which the reference signal is sampled is unity.

3. The apparatus of claim 1, in which the means for sampling the reference signal is a sample and hold circuit that is actuated responsive to a comparator to which the original signal and the phase shifted portion of the reference signal are applied.

4. The apparatus of claim 1, in which the variable quantity represents the value of an angular position.

5. The apparatus of claim 1, in which the function of the variable quantity is a sine function and the reference signal is sinusoidal.

6. The apparatus of claim 1, in which the means for generating an original signal comprises a signal source representing an angular value connected to a periodic function generator.

7. A method of generating an electrical signal that represents a periodic function of a variable quantity other than time shifted in phase by a predetermined amount, the method comprising the steps of:
   generating an electrical reference signal that represents the periodic function of time;
   splitting the reference signal into two portions;
   shifting the phase of one portion of the reference signal by the predetermined amount in the opposite direction from the desired phase shift;
   comparing the amplitudes of the phase shifted portion of the reference signal and an original signal that represents the periodic function of the variable quantity without a phase shift; and
   sampling the other portion of the reference signal each time the amplitude ratio of the compared signals assumes a predetermined relationship, the sampled portions of the reference signal representing the periodic function of the variable quantity shifted in phase by the predetermined amount.

8. The method of claim 7, in which the ratio of the maximum amplitude of the reference signal to the maximum amplitude of the original signal is unity and the other portion of the reference signal is sampled when the amplitude of the phase shifted portion of the reference signal exceeds the amplitude of the original signal.

9. A method of generating a signal having a characteristic that represents a periodic function of a variable quantity other than time shifted in phase by a predetermined amount, the method comprising the steps of:
   generating an original signal having a characteristic that represents a periodic function of the variable quantity without a phase shift;
   generating a reference signal having the same characteristics representing the periodic function of time;
   shifting the phase of one portion of the reference signal by the predetermined amount in the opposite direction from the desired phase shift;
   comparing the characteristic of the phase shifted portion of the reference signal and the original signal; and
   sampling another portion of the reference signal to determine the value of the characteristic each time the characteristic of the compared signals assumes a predetermined relationship, the value of the characteristic of the sampled portion of the reference signal representing the periodic function of the variable quantity shifted in phase by the predetermined amount.

10. A control system with a common ground comprising:
    a single source of electrical signals representing the sine function of a variable quantity;
    an element to be controlled responsive to the value of the variable quantity;
    a three-phase synchro receiver having a rotor mechanically coupled to the element to be controlled and three inputs;
    means for producing a first carrier the amplitude of which is modulated with the signal from the single source;
    means for coupling the first modulated carrier to one input of the synchro receiver;
    means for generating a signal representing the variable quantity shifted in phase by 60°;
    means for producing a second carrier the amplitude of which is modulated with the phase shifted signal, the second carrier being at the same frequency as and in phase with the first carrier;
    means for coupling the second modulated carrier to the second input terminal of the synchro receiver; and
    means for connecting the third input terminal of the synchro receiver to the common ground.

11. The control system of claim 10, in which the generating means comprises means for generating a reference signal that represents the sine function of time, means for shifting the phase of one portion of the reference signal by 60°, and means responsive to the occurrence of a predetermined relationship in the amplitude ratio of the phase shifted portion of the reference signal to the signal from the single source for sampling another portion of the reference signal.

12. The control system of claim 11, in which the means for producing a first carrier is a modulator that modulates the reference signal with the signal from the single source and the means for producing a second carrier is a modulator that modulates the reference signal with the phase shifted signal.

13. Apparatus for generating a signal that represents the sine of an angular position shifted in phase by a predetermined amount, the apparatus comprising:
   means for generating an original signal that represents the sine of the angular position without a phase shift;
   means for generating a reference signal that represents a sinusoidal function of time;
   means for shifting the phase of the first portion of the reference signal by the predetermined amount in the opposite direction from the desired phase shift; and
   means responsive to the occurrence of equality between the amplitudes of the phase shifted portion of the reference signal and the original signal for sampling the amplitude of a second portion of the reference signal, the amplitude samples of the second portion of the reference signal representing the sine of the angular position shifted in phase by the predetermined amount.

14. A method of generating an electrical signal that represents the sine of an angular position shifted in phase by a predetermined amount, the method comprising the steps of:
   generating an electrical reference signal that represents the sinusoidal function of time;
   splitting the reference signal into two portions;
   shifting the phase of one portion of the reference signal by the predetermined amount in the opposite direction from the desired phase shift;
   comparing the amplitudes of the phase shifted portion of the reference signal and an original signal that represents the sine of the angular position without a phase shift; and
   sampling the other portion of the reference signal each time the amplitudes of the phase shifted portions of the reference signal and the original signal are equal, the sampled portions of the reference signal representing the sine of the angular position shifted in phase by the predetermined amount.

References Cited

UNITED STATES PATENTS 3,079,539   2/1963   Guerth _____ 318—20.290

THOMAS E. LYNCH, Primary Examiner

U.S. Cl. X.R.

318—24, 692